United States Patent Office 3,494,888
Patented Feb. 10, 1970

3,494,888
RESIN COMPOSITIONS FROM POLYEPOXIDES AND ISOCYANATE POLYMERS
Wilbur R. McElroy, 514 W. Sullivan St.,
Olean, N.Y. 14760
No Drawing. Filed Aug. 30, 1966, Ser. No. 575,962
Int. Cl. C08g *30/14, 45/12*
U.S. Cl. 260—47
8 Claims

ABSTRACT OF THE DISCLOSURE

New polymerizable compositions of matter and a process for producing same are described herein. Said compositions comprise mixtures of polyepoxide monomers or polymers and polyisocyanate polymers containing isocyanurate or uretdione rings, or both of these, and isocyanate groups. Utility may be found in the production of laminates using glass cloth in combination with said compositions of matter when cured by heat. Other applications may be found in coatings and adhesives.

---

This invention relates to novel polymerizable, curable compositions of matter for producing resins; methods of producing the same; thermoplastic compositions produced therefrom and methods of producing the said compositions; thermoset resins produced therefrom and methods of producing said resins.

In the simplest terms the novel curable compositions of matter may be described as mixtures of a polyepoxide and a polyisocyanate polymer containing isocyanurate and/or uretdione rings. This composition of matter may be a simple mixture of a monomeric or polymeric polyepoxide and a polyisocyanate polymer containing isocyanurate rings and/or uretdione rings made by mixing said polyepoxide and a separately produced polyisocyanate polymer containing said chemical structures or it may be a more complex mixture formed by coreaction and/or polymerization of a polyisocyanate in situ in admixture with said polyepoxide to form a reaction mixture which may comprise some urethane groups, formed by reaction of isocyanate with hydroxyl groups on said polyepoxide, some ether groups formed by homopolymerization of the polyepoxide, some isocyanurate rings, some uretdione rings, some free NCO groups and some free epoxide groups. The uretdione rings are sometimes called uretidine diones or 1,3 diazacyclobutane-2,4 diones.

When the novel compositions of matter are made by polymerization of a polyisocyanate in situ in a polyepoxide, the reaction is carried out in such a way, as described in later paragraphs, that a stable product is formed which is capable of further polymerization, by methods described in later paragraphs, to form either thermoplastic intermediates or highly cross-linked heat stable thermoset plastics.

It is well known to polymerize monoisocyanates and polyisocyanates to produce polymers which contain isocyanurate rings and/or uretidine dione rings. An informative discussion of this is the publication by J. H. Saunders and K. C. Frisch, given in Polyurethanes, Chemistry and Technology, Part I. Interscience Publishers (1962), pages 91–97. Many organic and inorganic catalysts have been used. The technology of isocyanate trimerization which is the process of polymerizing isocyanates to produce isocyanurate rings is described in detail in many United States and foreign patents. The use of certain metal catalysts is described by Britain et al. in Journal of Applied Polymer Science, vol. 4, 207 (1960) and in British Patent 949,253 and German Patent 1,174,790. The use of a phosphine catalysts is described in U.S. Patent 2,801,244. The use of tertiary amine catalysts is described in U.S. Patent 2,954,365. The use of tertiary amines and alkyl monoepoxide cocatalysts is described in U.S. Patents 2,979,485, 3,168,483, 3,211,703, 3,211,704. The use of a tertiary amine and a tertiary imine cocatalyst system is described in U.S. Patent 3,154,522. The use of tertiary imine catalysts is described in U.S. Patent 3,146,219.

The use of diazabicyclo-octane and aldehyde cocatalysts is described in U.S. Patent 3,197,626. The use of organic hydroxide catalysts is described in U.S. Patent 3,108,100.

It is known to simultaneously react a liquid epoxy resin and isocyanate-terminated polyether prepolymer with an aromatic diamine to produce an elastomer or an elastoplastic as described in Development Products Report No. 10, Adiprene L, A Liquid Urethane Elastomer by R. J. Athey et al., Mar. 15, 1958, E. I. du Pont de Nemours & Co., Inc. It is also known to add small amounts of an epoxy resin to a polyurethane gum stock which is cured by a peroxide to improve the properties of the resulting elastomer as in U.S. Patent 3,148,167. The reaction products of epoxy resins and aryl alkyl amine-blocked polyisocyanates are known as in U.S. Patent 3,227,679.

It is known to react simultaneously a monomeric polyisocyanate and an epoxy resin with a mono-, di- or polyamine curing agent as in U.S. Patent 2,829,984.

It is known to react mixtures of polyisocyanates and polyepoxide resins in the presence of heat liable boron trifluoride-amine complexes so that when heated, the polyepoxides are polymerized to produce hydroxyl groups which then react with the polyisocyanate as in U.S. Patent 3,198,851.

It is known to react simultaneously, an isocyanate terminated prepolymer, an epoxy resin, an aromatic diamine and a polyol as in U.S. Patent 3,158,586.

Mixtures of polyepoxides and the dimers and trimers of polyisocyanates have not previously been made nor the outstanding utility of such mixtures recognized. These are new compositions of matter which are shown in later sections of this application to have many practical uses.

An object of this invention is to provide novel, polymerizable, curable compositions of matter for producing resins. Another object of this invention is to provide novel methods of producing said novel polymerizable, curable compositions of matter. Another object of this invention is to provide novel resins resulting from the curing of said new compositions of matter to produce new materials of commerce having outstanding properties.

The novel compositions of matter of this invention may be prepared in many ways. In broad terms, these new compositions of matter comprise mixtures of a polyisocyanate polymer containing isocyanurate rings and/or uretdione rings and a polyepoxide. The scope of the definition of the new compositions of matter is not limited by the method of preparation.

Isocyanurate rings are also known as isocyanate trimer rings. Such rings can be produced by trimerization of a mono or polyisocyanate either separately or in admixture. In order to produce a trimer which has free NCO groups at least one polyisocyanate must be present in the polymerizing mixture. Uretdione rings are also known as isocyanate dimer rings. In order to produce a dimer having free NCO groups, at least one polyisocyanate must be present in the polymerizing mixture. The polyisocyanate polymer used may contain more than one isocyanurate ring and the use of polymers containing ten or more isocyanurate rings per molecule are envisioned. When the polyisocyanate polymer contains more than one isocyanurate ring, these rings are connected, through nitrogen on the ring, by means of interconnecting segments which may be aromatic rings, aliphatic segments, aliphatic segments containing oxygen, sulfur, phosphorus, silicon or other atoms in the segment, segments containing ester groups, segments containing amide groups, segments which are either linear or branched, segments with wide variation in molecular weight from about 28 to 6000 or more.

The novel compositions of matter may be made by mixing together a polyepoxide and an isocyanate polymer of the types described in the presence or absence of other materials or the isocyanate polymer can be made in situ in the presence of the polyepoxide and in the presence or absence of other substanecs by use of known catalysts and/or heat as required.

Polyepoxides are well known to polymerize alone under the influence of tertiary amine catalysts. Two U.S. patents which use this principle are 2,553,718 and 2,548,447. It was surprising to find that polyisocyanates which are also polymerized by tertiary amine catalysts can be preferentially polymerized in a liquid polyepoxide using a tertiary amine catalyst. After such a polymerization as allowed to proceed to any desired degree of polymerization, it can be stopped by adding an acidic substance in an amount at least equivalent to the tertiary amine catalyst. Any known catalyst can be used and selected by a method described in later paragraphs. Any material which absorbs or reacts with the catalyst to make it inactive is used as a stopper, or the catalyst may be removed by physical means depending upon the individual circumstances. Thereafter, the mixtures of polyepoxide and polyisocyanate polymer are stable for a long period of time and can be used with curing agents and in other processes to manufacture articles of commerce. Solvents can be present during the polymerization process if desired or required.

Partial polymerization of the polyepoxide may occur simultaneously, but nevertheless a preferential polymerization of the polyisocyanate occurs so that in many cases a liquid solution of a polyisocyanate polyer in a liquid polyepoxide results, providing new compositions of matter which are easy to handle and have great utility. In other cases, mixtures of normally solid polyepoxides and polyisocyanate polymers are made; these can be melted together and used or used admixed in solution in solvents non-reactive toward isocyanate and epoxide groups. Liquid isocyanate-terminated prepolymers made from an excess of a polyisocyanate and a polyol can be trimerized or polymerized in situ in a polyepoxide.

The utility of these new compositions of matter is found when these mixtures of polyepoxides and polyisocyanate polymers are further reacted alone or by catalytic means or by means of curing agents which are reactive toward isocyanate and/or epoxide groups. Generally speaking, such reactive materials are those which contain active hydrogen atoms as determined by the Zerewitinoff Test described by Kohler, J.A.C.S. 49, 3181 (1927), anhydrides and boron trifluoride-amine complexes which dissociate at temperatures from about 60 to 300° C. Curing may be done at room temperature or at elevated temperature depending upon the reactants and the nature of the product desired. By means of selected curing agents and the amount employed and by control of conditions, thermoplastic moldable intermediates can be made which can then be cured to highly crosslinked resins by means of heat. On the other hand, by using a different amount of the same curing agent and/or different conditions, a highly crosslinked resin is made at once.

The mechanism of cure has not been fully elucidated. However, it can be speculated that when a deficiency of a curing agent which reacts with both isocyanate and epoxide groups such as an aromatic diamine is used, it reacts primarily with the isocyanate groups first, then if any amine groups remain, they react with epoxide groups. Intermediates of this type are thermoplastic. When heated, these materials are moldable and cure to thermoset resins, probably by reaction of the polyepoxide with the urea groups present. Moldable thermoplastic intermediates can also be made by reaction of the isocyanate content with a polyol. When heated to elevated temperature of about 130° C. to 200° C., these materials are converted to thermoset resins probably by reaction of the polyepoxide with urethane groups. Curing agents which can be used among others to produce the thermoplastic intermediates are water, hydrogen sulfide, ammonia, glycols, polyether polyols, polyester polyols and the like.

More specifically, glycols which may be used include ethylene glycol, propylene glycol, 1,3 butylene glycol, 1,4 butanediol, 2,3 butylene glycol, pentanediol, hexanediol, neopentyl glycol and glycols with 20 or more carbon atoms. Polyether and polythioether polyols in the molecular weight range up to about 6000 or more are useful. Aromatic amines such as methylene dianiline, methylene bis (orthochloro aniline) and the like are useful. Aromatic diamines with other substituents on the aromatic ring such as halogen, alkyl, aryl, halo alkyl, halo aryl, alkoxy, aryloxy, nitro, cycloalkyl and the like are useful. Polyester polyols derived from polycarboxylic acids and polyols or derived from caprolactones are useful. Polyester amide polyols are useful. Polyols containing a high aromatic content such as hydroquinone di (beta hydroxyethyl) ether and 2,2 bis (4 hydroxyphenyl) propane di (beta hydroxyethyl) ether, are useful. Tetrols such as those derived from the condensation of alkylene oxides with ethylene diamine can be used. Aliphatic amines can be used, but these are very reactive and difficult to handle in the systems because they react very fast with both epoxide and isocyanate groups. Polyols such as trimethylolpropane, pentaerythritol and sorbitol can be used. Amine terminated polyamides can be used.

Although any of the polyfunctional curing agents of the general types described in foregoing paragraphs cure the novel compositions of matter when used with proper consideration of the stoichiometry of the system and when heated as required to cause the reactions to occur to the desired degree, nevertheless careful consideration must be given to the handling characteristics of all materials used in any given system to ensure that the reacting substances are brought together in such a way that a homogeneous reaction mass is produced. For example, if the novel composition of matter is to be used in a solid form and the curing agent is in a solid form, they might be brought together in a common solvent or they might be melted together to cause reaction to occur. Methods of bringing the materials together to cause reaction is illustrated in the examples.

Curing agents which have higher functionalities tend to produce higher heat distortion temperatures in the resins which are produced. The use in the novel compositions of matter of polyisocyanate polymers which have multiple isocyanurate rings also have this tendency as well as contributing to higher thermal stability of the final resins.

The use in the novel compositions of matter of polyepoxides which have one or more stable ring configurations other than the reactive epoxide rings also contribute to higher heat distortion temperatures and heat stability. The use of components which contain halogen, phosphorus, antimony, silicon and the like tend to improve the non-burning characteristics.

The amount of curing agent used and the temperature conditions influence the result. At very high temperatures in excess of about 200° C. and up to about 300° C. cures can be effected without any additional curing agent. Although it is not known to what extent the ratio of epoxide groups to isocyanate and/or isocyanurate rings and/or uretdione rings can be varied to achieve this result, specific instances of this type of cure are given in the examples which illustrate the invention. Curing agents can be used in amounts varying from none to that equivalent to about half the isocyanate groups, to that equivalent to all of the isocyanate and epoxide groups combined, to a fairly large excess up to 150% or more, depending upon the desired result and the temperature conditions used.

When polyol or aromatic diamine curing agents are used at about 25° C. to 75° C. with only short exposure to the higher temperature and the amount is about equivalent to the isocyanate content and the isocyanate content is about equivalent to the epoxide content, a moldable intermediate is formed. As a general guide, the higher the temperature, and the nearer the equivalents of curing agent approaches the sum of the equivalents of the isocyanate and epoxide groups, the more crosslinked and thermoset the resin becomes. Resins with very high heat distortion temperatures and resistance to heat can be produced. The thermal stability of the isocyanurate ring contributes greatly to this.

When the boron trifluoride-amine complexes are used, a different mechanism probably occurs. In this case the polyepoxide is polymerized, when heat is applied, forming hydroxyl groups which can react with NCO groups on the polyisocyanate polymer to produce crosslinking. The amine which is liberated can also react with isocyanate to produce urea groups which are reactive toward epoxide groups. The amine could also react directly with epoxide groups to effect crosslinking.

In producing the novel compositions of matter of this invention, any polyepoxide can be used. The polyepoxide may be a relatively low molecular weight diepoxide or polyepoxide monomer or it may be a polymeric polyepoxide such as those known as epoxy resins or ethoxyline resins.

Polyepoxides with more than two epoxide groups per molecule may be used. The epoxy resins which are useful in this invention are well known and profusely described in prior art including the technical and patent literature. By reference, the following patents are intended to be part of the present description of the ethoxyline resins which are useful and will not be described other than that they contain more than one ethylene oxide or epoxide group per molecule: U.S. Patents 2,324,483; 2,444,333; 2,494,295; 3,227,679; 2,500,600; 2,511,913; 2,658,885; British Patents 518,057; 579,698.

Among others, these ethoxyline resins include those prepared by effecting reaction between a polyhydric phenol or alcohol, for example, phenol, hydroquinone, resorcinol, glycerine, bisphenol-A with epichlorohydrin; they also include epoxidized Novolac resins derivel from polyfunctional phenols; they also include epoxidized polyenes.

By reference, the following patents are intended to be part of the present description of the diepoxide or polyepoxide monomers which are useful and will not be described other than that they contain more than one epoxide group per molecule: U.S. Patent 3,198,851; 2,716,-123; 2,745,847; 2,750,395; 2,863,881; 2,779,771.

Among others these polyepoxide monomers include diepoxides of cycloaliphatic esters, polyesters of 3,4-epoxycyclohexane-carboxylic acid and a polyol including polyethers, polyesters of 3,4-epoxycyclohexylmethanol and organic polycarboxylic acids, bis (3,4-epoxycyclohexylmethyl) ether and its homologs, glycidyl ethers of polyhydric phenols, glycidyl ethers and alkyl substituted glycidyl ethers of alkane diols including polyethers, glycidyl esters of polycarboxylic acids and polyepoxides derived from any polyunsaturated hydrocarbon.

The polyisocyanate polymers which are useful in the novel compositions of matter of this invention are those which contain isocyanurate and/or uretdione rings sometimes known as isocyanate trimer and dimer rings. These rings contain alternate carbon and nitrogen atoms. These polymers also contain isocyanate groups. They may be pure dimers or trimers of polyisocyanates or polymers containing isocyanurate and/or uretdione rings derived from mixtures of mono and polyisocyanates or higher molecular weight polymers of polyisocyanates or of mixtures of polyisocyanates and monoisocyanates. Among others are included the trimer of 2,4-toluylene diisocyanate, the dimer of 2,4-toluylene diisocyanate, the dimer of diphenylmethane diisocyanate, higher molecular weight polymers of toluylene diisocyanate containing isocyanurate rings and polymers or adducts containing isocyanurate and/or uretdione rings resulting from the catalytic polymerization of isocyanate-terminated prepolymers and adducts formed by reaction of an excess of a polyisocyanate with a polyol, a polyether polyol, polyester polyol, polyesteramide polyol and the like which may contain oxygen, sulfur, silicon, phosphorus or other atoms in the chain.

When the isocyanate polymers are made in situ in the polyepoxide, any diisocyanate or polyisocyanate or mixtures of these with a monoisocyanate may be used, or said isocyanate-terminated adducts or prepolymers may be used.

Any known catalyst for the polymerization of isocyanates may be used. Preferably catalysts which have little or no effect on the polyepoxide are chosen. Catalysts heretofore mentioned for the polymerization of isocyanates can be chosen for each particular combination in the following way. A catalyst known to polymerize isocyanates is chosen for test in a particular polyepoxide which is to be used to make the new composition of matter. The catalyst is introduced into the polyepoxide in several concentrations varying from about 0.001% to 0.5% by weight, and each mixture is let stand for 24 hours at room temperature with measurement of viscosity before and after. Little or no change in viscosity indicates little or no activity of the catalyst in a particular concentration toward polymerization of the polyepoxide. In this way, a catalyst and the concentration thereof which is not active toward polyepoxide polymerization can be selected for polymerization of the isocyanate in the polyepoxide. In some cases a certain degree of polymerization of the polyepoxide is desirable, in which case the catalyst is chosen accordingly.

Acidic substances which can be used to stop the polymerization reaction when tertiary amines are used as catalysts are among others toluene sulfonic acid, methyltoluenesulfonate, hydrogen chloride, phosphoric acid, acetic anhydride, benzoyl chloride, phthalyl chloride, other acid chlorides and other mineral and carboxylic acids and anhydrides.

Volatile catalysts may be removed by vacuum distillation to stop the reaction.

In some cases molecular sieves may be used to absorb the catalyst to stop the reaction.

Many practical uses are seen for the novel compositions of matter of this invention and for the products derived therefrom. The new compositions of matter contain both NCO groups and epoxide groups. Those which contain the isocyanurate rings in relatively large proportions, are converted to resins which possess exceptional heat stability beyond that of conventional heretofore known polyurethane resins or epoxy resins.

The new compositions of matter are useful in solution form, in moisture cured coatings and in two component systems useful for coatings, adhesives, laminate impregnants and other surface treatments.

The liquid types of the new compositions of matter in 100% solids form are useful in two component systems as casting resins, sealants, coatings, elastomers and adhesives. Some of these have very low working viscosity and very long pot life and produce end products which have outstanding properties for specific uses including resistance to severe mechanical shock.

The new compositions of matter are useful as single-component adhesives for bonding laminated structures when converted to thermoset resins by heating to temperatures above about 200° C.

The new compositions of matter are useful in producing thermoplastic resins which can be converted to thermoset resins by application of heat.

The new compositions of matter are useful in producing thermoset resins by application of a catalyst at room temperature or at moderate temperature.

Glass laminates bonded using the new compositions of matter have very high heat distortion temperatures, excellent resistance to high temperature exposure in air and excellent electrical properties even after prolonged exposure to high temperatures.

The invention is further described and elucidated by the following working examples:

EXAMPLE 1

A powdered trimer of toluylene diisocyanate containing an isocyanurate ring and 24% NCO content, 17.4 parts, is mixed with 19.0 parts of an epoxy resin derived from bisphenol-A and epichlorohydrin having two epoxide groups per molecule and an equivalent weight of 190 sold as Epon 828 to form a paste. Four layers of glass cloth, each coated on both sides with said paste are pressed at 1500 p.s.i. for one hour at 250° C. producing a strong, rigid laminate. In another procedure, the said paste is dissolved in acetone to form a 30% solids solution and the layers of glass cloth are impregnated with the solution and dried free of solvent, thereafter pressed at 1500 p.s.i. for one hour at 250° C. to produce a strong laminate.

EXAMPLE 2

A powdered trimer of toluylene diisocyanate containing an isocyanurate ring and 24% NCO content, 17.4 parts, is mixed with 12.1 parts of 3,4-epoxycyclohexylmethyl 3,4-cyclohexane-carboxylate sold as the product ERLA 4221 to form a paste. Four layers of glass cloth, each coated on both sides with said paste are pressed at 1500 p.s.i. for one hour at 250° C. producing a strong, rigid laminate with a very high heat distortion temperature.

EXAMPLE 3

A powdered dimer of toluylene diisocyanate containing a uretdione ring and 23.8% NCO content, 43.5 parts, is mixed with 45.0 parts of Epon 815 to form a paste. The Epon 815 is a diepoxide having an equivalent weight of 180 and derived from epichlorohydrin and bisphenol-A.

EXAMPLE 4

A powdered trimer of phenyl isocyanate containing an isocyanurate ring and zero NCO content, 11.9 parts, is mixed with 18.0 parts of the Epon 815 to form a paste. Glass cloth is coated on both sides with the paste and pressed in attempt to make a laminate as in Example 3. A laminate is not produced, and no evidence of curing is obtained.

EXAMPLE 5

An isocyanate polymer containing an isocyanurate ring and 20.4% NCO content is produced by adding triethylene diamine catalyst to a solution in n-heptane of 2.5 moles of toluylene diisocyanate and 1.0 mole of phenyl isocyanate. The material is powdered and 17.4 parts made into a paste with 12.1 parts of Epon 815. Glass cloth is coated on both sides with the paste and pressed as in Example 3 to form a strong rigid laminate.

EXAMPLE 6

A trimer of toluylene diisocyanate containing 23.1% NCO and an isocyanurate ring 190 parts, and 82 parts of the diepoxide derived from dicyclopentadiene sold as Unox Epoxide 207 are dissolved in acetone to form a 40% solids solution. Glass cloth is dipped in this solution, drained and dried 20 minutes at 50° C. in an oven to remove the acetone, then pressed four layers thick at 1500 p.s.i. and 250° to 310° C. for 30 minutes to form a laminate which is strong and rigid and has a very high heat distortion temperature.

EXAMPLE 7

Polymeric polyisocyanate polymers containing an isocyanurate ring are prepared in liquid polyepoxides by addition of catalysts as shown in Table 1 and allowing to stand at room temperature for the times shown, thereafter adding a stopper methyltoluenesulfonate to stop the reaction. Mixtures thus prepared are stable for long periods of time in the absence of moisture. They show by infrared analysis the band at 7.05 and 5.85 microns characteristic of the trimer of toluylene diisocyanate. In experiments B, C and D are shown the stability of a polyepoxide in the presence of three different catalysts in concentrations which are effective in polymerizing a polyisocyanate monomer in situ in the polyepoxide.

TABLE I

| | A | B | C | D | E | F | G | H |
|---|---|---|---|---|---|---|---|---|
| Toluylene diisocyanate | 348 | | | | 50 | 50 | 50 | 50 |
| Epon 815 | | 200 | 200 | 200 | 200 | 200 | 200 | 200 |
| ERLA 4221 | 240 | | | | | | | |
| Propylene oxide | 6 | | | | 2 | 2 | 2 | |
| N-ethyl morpholine | 0.04 | 0.04 | | | | 0.04 | | |
| Dimethyl cyclohexylamine | 0.16 | | 0.04 | | 0.04 | | | 0.04 |
| Triethylene diamine | 0.06 | | | 0.04 | | | 0.04 | |
| Methyl toluene sulfonate | 0.12 | 0.12 | 0.12 | 0.12 | 0.12 | 0.12 | 0.12 | 0.12 |
| Product description | (1) | (2) | (2) | (2) | (3) | (3) | (3) | (3) |
| Percent NCO | 24.3 | (2) | (2) | (2) | 2.7 | 3.8 | 2.4 | 2.9 |
| Theoretical NCO content for TDI trimer | 14.3 | | | | 4.8 | 4.8 | 4.8 | 4.8 |
| Reaction time, hours | 20 | 20 | 20 | 20 | 20 | 20 | 20 | 20 |

| | I | J | K | L | M | N | O |
|---|---|---|---|---|---|---|---|
| Toluylene diisocyanate | 50 | 50 | 100 | 200 | 200 | 300 | 300 |
| Epon 815 | 200 | 200 | 200 | 200 | 100 | 100 | 75 |
| ERLA 4221 | | | | | | | |
| Propylene oxide | | | | 2 | 2 | 3 | 3 |
| N-ethyl morpholine | 0.04 | | 0.04 | 0.04 | | | |
| Dimethyl cyclohexylamine | | | | | 0.04 | 0.04 | 0.04 |
| Triethylene diamine | | 0.04 | | | | | |
| Methyl toluene sulfonate | 0.12 | 0.12 | 0.12 | 0.12 | | | |
| Product description | (3) | (3) | (3) | (3) | (3) | (4) | (4) |
| Percent NCO | 4.1 | 3.4 | 8.4 | 14.1 | 16.6 | 10.5 | 10.5 |
| Theoretical NCO content for TDI trimer | 4.8 | 4.8 | 8.0 | 12.1 | 16.1 | 18.1 | 19.3 |
| Reaction time, hours | 20 | 20 | 20 | 40 | 8 | 8 | 8 |

[1] Slurry.  [2] No change observed from original.  [3] Viscous liquid.  [4] Brittle solid.

Glass cloth is coated on both sides with the paste and pressed four layers thick at 1500 p.s.i. and 250° C. to produce a strong rigid laminate. When the Epon 815 alone is coated on the glass cloth and pressed under the same conditions, a strong laminate is not formed, and no evidence of curing is obtained.

EXAMPLE 8

The materials of Example 7, parts E, F and G containing the stopper methyltoluenesulfonate are placed in an oven at 121° C. for 44 hours and all remain liquid showing good stability. When 0.3% dimethylcyclohexylamine is added to Part J of Example 7 containing methyltoluenesulfonate, the material gels at room temperature and becomes firm, or at 120° C. becomes rubbery in 5 minutes and a hard brittle solid after 20 hours at 120° C.

EXAMPLE 9

An epoxy resin Epon 815 which is a diepoxide of 180 equivalent weight, 200 parts, is mixed with an isocyanate terminated prepolymer, 200 parts, made by reaction of an excess of toluylene diisocyanate containing about 80% 2,4-isomer and 20% 2,6-isomer with a 2000 M.W. polypropylene glycol in an amount such that the NCO content of the prepolymer is 7.0% and mixed with 0.2 part of N-ethylmorpholine. After standing 44 hours at about 25° C., 0.48 part benzoyl chloride is added. The viscosity at 25° C. is about 30,000 cps. and the NCO content 1.9%. Thereafter the material is stable for a long period of time in the absence of moisture. To 100 parts of this material containing 1.9% NCO at 40° C. is added 34.4 parts of liquid' methylene bis(orthochloroaniline) preheated to 120° C. The mixture is readily degassed under vacuum and cast into molds. The working life is at least 1.5 hours at 50° C. The parts are cured for 18 hours at 130° C. producing specimens with a hardness of Shore D 75–72 and resistance to mechanical shock. A disc ⅜" thick by 4" diameter resists repeated hard blows from a hammer without cracking.

EXAMPLE 10

To 25 parts of Part I of Example 7 at 70° C. is added 18.5 parts of liquid methylene bis(orthochloroaniline) preheated to 120° C. The working life of this system is about 3 minutes. Discs are cast which are about ⅜" thick and 4" in diameter. One disc cured 18 hours at 120° C. is a very hard resin which resists repeated blows from a hammer when struck on a concrete floor. Another disc let stand at room temperature 20 hours is a brittle solid. When ground to a powder, this solid is readily molded and shaped into homogeneous thermoset plastic parts by compression molding at about 120 to 150° C.

EXAMPLE 11

To 100 parts of Part L of Example 7 at 40° C. is added 44.5 parts of methylene bis(orthochloroaniline) in one case and 81.5 parts in a second case. Specimens are cast and cured 18 hours at 152° C. The plastic resulting from the first case has a heat distortion temperature of about 270° C. while that of the second case has a heat distortion temperature of about 200° C. Materials resulting from the said first and second mixtures cured at room temperature for 20 hours are pulverized and compression molded at 175–185° C. to produce homogeneous thermoset plastic parts. A specimen thus molded from said first mixture is firm at 250° C. and rubbery at 260° C.

EXAMPLE 12

To 50 parts of the product of Park K of Example 7 containing 8.4% NCO is added 50 parts of a 1000 molecular weight polytetramethylene ether glycol at 50° C. The mix becomes clear at 100° C. and is degassed and cast in molds. Castings gel in 15 minutes at 100° C. or in about 90 minutes at 70° C. An elastomeric product of Shore A 33 is produced upon curing 4 hours at 138° C. The castings are optically clear.

EXAMPLE 13

To 30 parts of the product of Part E of Example 7 containing 2.7% NCO is added 9 parts of a 1000 molecular weight polytetramethylene ether glycol at 80° C. A white opaque paste is formed which is cast into molds and cured at 138° C. for 4 hours producing an optically clear elastomeric product with a hardness of Shore A 25 and not much strength.

EXAMPLE 14

To 20 parts of the product of Part F of Example 7 is added 9.2 parts of methylbicyclo[2.2.1]heptene-2,3-dicarboxylic anhydride isomers sold as Nadic Methyl Anhydride at 100° C. The viscosity is very low at 100° C. and remains very low when heated for many hours at 140° C. However, when 0.5% of stannous octoate is added the material gels in 1 hour at 140° C. and cures to a solid resin in 4 hours.

EXAMPLE 15

A 40% solids solution of Part F of Example 7 in a 1 to 1 blend of acetone and 4-methoxy-4-methyl-pentanone-2 is made and 1,4-butanediol is added at 25° C. in an amount such that the NCO/OH equals 0.90. The viscosity of the reaction mixture is very low and remains so for many hours at 25° C. Glass cloth is dipped in the reaction mixture and dried free of solvent at 70° C. then pressed 4 layers thick at 1500 p.s.i. at 175° C. for one hour producing a strong flexible laminate.

EXAMPLE 16

A 25% solids solution of the product of Part N of Example 7 is made in acetone. A stoichiometric amount of 1000 molecular weight polytetramethylene ether glycol is added and a gel forms in about 2 hours at 25° C. The solvent is removed at 25° under vacuum and the rubbery solid resin is pressed between glass cloth at 1500 p.s.i. and 175° C. for one hour to produce a laminate.

EXAMPLE 17

A solution is made of 60 parts of the product of Part K of Example 7 containing 8.4% NCO and 40 parts of the solvent 4-methoxy-4-methyl-pentanone-2. To 25 parts of said solution is added 1.7 parts of 1,4-butane-diol. A slight viscosity increase is observed, and the resulting solution remains clear and fluid for at least 18 hours. This solution eventually gels. After about 30 minutes standing this solution is applied to swatches of glass cloth and dried free of solvent whereupon the cloth is dry to the touch, not tacky, and can be stacked in layers without sticking together. The cloth is pressed together four layers thick at 1500 p.s.i. and 175° C. for 1 hour to produce a strong laminate very light in color.

EXAMPLE 18

A solution is made of 66.66 parts of the product of Part L of Example 7 and 33.34 parts of acetone. Swatches of glass cloth are dipped in the solution and drained free of excess solution then treated in the ways shown below and pressed four layers thick at 1500 p.s.i. for 1 hour at the temperatures shown to produce laminates.

(a) Dry 20 minutes at 50° C.; expose to ammonia vapor for 2 hours; press at 185° C. Laminate is translucent, extremely hard and rigid.

(b) Expose to 90% relative humidity at 25° C. for 2 hours; press at 175° C. Laminate is strong and rigid.

(c) Dry 20 minutes at 50° C.; press at 250° C. Laminate is strong, hard and rigid.

(d) Dry 20 minutes at 50° C.; press at 220° C. Laminate is strong, hard, rigid.

(e) Dry 20 minutes at 50° C.; press at 200° C. Laminate is delaminated by bending and is not strong.

(f) The laminate of (e) is pressed again at 245° C. forming a strong rigid structure.

The laminate of (c) when heated in air at 285° C. loses 1% in weight in 1 hour, 4% in 17 hours, 7% in 45 hours, 9.5% in 110 hours. After 20 hours at 275° C. the volume resistivity is $7 \times 10^{15}$ ohm-cm. and the surface resistivity $3 \times 10^{13}$ ohms.

EXAMPLE 19

A solution is made of 60 parts of the product of Part K of Example 7 and 40 parts of 4-methoxy-4-methyl-pentanone-2.

To 25 parts of water containing 0.25 part of a sodium alkylbenzene sulfonate emulsifier is added 10 parts of said solution with rapid agitation. A thick fluid material is formed. Said fluid is applied to glass cloth and dried tack free in 1 hour at 50° C.; then four layers of treated cloth are pressed at 1500 p.s.i. for 1 hour at 175° C. to form a strong laminate.

EXAMPLE 20

A solution is made of 20 parts of the product of Part K of Example 7 and 80 parts of 4-methoxy-4-methyl-pentanone-2. To 100 parts of said solution is added 0.5 part of water and after standing 18 hours a rubbery gel is formed. The solvent is removed to form a hard, brittle white opaque thermoplastic solid which is molded under heat and pressure to form a clear yellow thermoset plastic with high heat distortion temperature.

Hereinabove, the polyisocyanate polymers useful in this invention have been described generally as to structure in a relatively broad sense, and reference has been made to certain materials in particular. Other polyisocyanate polymers which are also useful containing one or more isocyanurate and/or uretdione rings and residual free NCO content are derived from the following typical polyisocyanates among others, but not limited to these: namely, toluylene diisocyanate containing a mixture of 2,4- and 2,6-isomers; triphenylmethane triisocyanate; polymethylene polyphenyl isocyanate; aliphatic diisocyanates containing about 2 to 20 carbon atoms; bitolylene diisocyanate; triisocyanates resulting from the reaction of three moles of an aliphatic diisocyanate with one mole of water; aromatic polyisocyanates containing substitutents on the aromatic rings in addition to isocyanato groups such as halogen, alkyl, aryl, halo alkyl, halo aryl, alkoxy, aryloxy, nitro, urethano, cycloalkyl; methylcyclohexane diisocyanate; cyclohexane triisocyanate; methylene bis (cyclohexyl isocyanate) and the like.

What is claimed is:

1. A polymerizable, curable composition of matter for producing resins comprising an isocyanate-bearing polyisocyanate polymer which has either an isocyanurate ring or a uretdione ring 1 or both, in its structure and a polyepoxide monomer or polyepoxide polymer, said polyepoxide materilas being formed from epoxy materials containing the three-membered epoxy ring structure and having free reactable epoxy groups therein.

2. A polymerizable, curable composition of matter as claimed in claim 1 wherein the polyisoycanate polymer is a polymer of toluylene diisocyanate containing either an isocyanurate ring or a uretdione ring, or both, in its structure.

3. A resin which is convertible by heat to a thermoset resin made by treatment of the composition of matter of claim 1 with a polyfunctional active hydrogen bearing compound reactive toward isocyanate groups in an equivalent amount equal to about 80% to 125% of the equivalents of isocyanate groups, keeping the reaction temperature between room temperature and about 80° C.

4. A resin of claim 3 wherein the active hydrogen bearing compound is reactive toward isocyanate groups and epoxide groups and is used in an equivalent amount equal to about 80% of the isocyanate groups to about 125% of the sums of isocyanate and epoxide groups.

5. A thermoset resin made by heating at about 100° to 185° C. the composition of matter of claim 1 mixed with a curing agent comprising a polyfunctional compound reactive toward isocyanate groups in an equivalent amount equal to about 80% to 125% of the equivalents of isocyanate groups.

6. A thermoset resin made by heating at about 100° to 185° C. the composition of matter of claim 1 mixed with a curing agent comprising a polyfunctional compound reactive toward isocyanate groups and epoxide groups in an equivalent amount equal to about 80% of the isocyanate groups to 125% of the sum of isocyanate and epoxide groups.

7. A thermoset resin made by heating at about 100° to 185° C. the composition of matter of claim 1 mixed with a curing agent comprising a compound reactive toward epoxide groups in an equivalent amount equal to about 80% to 125% of the epoxide groups.

8. A thermoset resin made by heating the composition of matter of claim 1 at about 200° to 300° C.

References Cited

UNITED STATES PATENTS 2,938,004   5/1960   De Hoff et al.
3,321,548   5/1967   Sattler.

WILLIAM H. SHORT, Primary Examiner

T. PERTILLA, Assistant Examiner

U.S. Cl. X.R.

117—161; 161—185; 260—59, 77.5, 830